United States Patent
Lee et al.

(10) Patent No.: US 10,864,704 B2
(45) Date of Patent: Dec. 15, 2020

(54) MOLDED PRODUCT

(71) Applicants: HONDA MOTOR CO., LTD., Tokyo (JP); SUNARROW LTD, Tokyo (JP)

(72) Inventors: Seonghun Lee, Wako (JP); Yuichi Takahashi, Tokyo (JP); Tomoomi Kiyomiya, Tokyo (JP)

(73) Assignees: HONDA MOTOR CO., LTD., Tokyo (JP); SUNARROW LTD, Tokyo (JP)

( * ) Notice: Subject to any disclaimer, the term of this patent is extended or adjusted under 35 U.S.C. 154(b) by 0 days.

(21) Appl. No.: 16/455,836

(22) Filed: Jun. 28, 2019

(65) Prior Publication Data
US 2020/0001570 A1  Jan. 2, 2020

(30) Foreign Application Priority Data

Jul. 2, 2018  (JP) .................................. 2018-126033

(51) Int. Cl.
  *B32B 7/12* (2006.01)
  *B32B 3/26* (2006.01)
  *B32B 7/04* (2019.01)

(52) U.S. Cl.
  CPC ................ *B32B 7/12* (2013.01); *B32B 3/263* (2013.01); *B32B 3/26* (2013.01); *B32B 7/04* (2013.01); *Y10T 428/23* (2015.01); *Y10T 428/231* (2015.01); *Y10T 428/233* (2015.01); *Y10T 428/234* (2015.01); *Y10T 428/24273* (2015.01); *Y10T 428/24298* (2015.01); *Y10T 428/24314* (2015.01); *Y10T 428/24479* (2015.01); *Y10T 428/24562* (2015.01); *Y10T 428/24612* (2015.01); *Y10T 428/24752* (2015.01); *Y10T 428/24802* (2015.01); *Y10T 428/24851* (2015.01)

(58) Field of Classification Search
  CPC .. B32B 7/12; B32B 3/263; B32B 3/26; B32B 7/04; B32B 1/00; Y10T 428/24612; Y10T 428/24479; Y10T 428/23; Y10T 428/24802; Y10T 428/233; Y10T 428/24273; Y10T 428/231; Y10T 428/24314; Y10T 428/234; Y10T 428/24298; Y10T 428/24752; Y10T 428/24562; Y10T 428/24851; C09J 7/29; C09J 2301/206; C09J 2301/16; C09J 2301/204; C09J 2301/124
  See application file for complete search history.

(56) References Cited

U.S. PATENT DOCUMENTS

2007/0218269 A1* 9/2007 Kato .......................... C09J 7/22
  428/304.4

FOREIGN PATENT DOCUMENTS

JP  2005-113085  4/2005

* cited by examiner

*Primary Examiner* — David Sample
*Assistant Examiner* — Donald M Flores, Jr.
(74) *Attorney, Agent, or Firm* — Amin, Turocy & Watson, LLP (57) ABSTRACT

A molded product includes a body including a flat part and a projection protruding from the flat part, a design member including a design surface, and an adhesive member sticking the design member to the body. The adhesive member includes a buffer portion formed by cutting off a part of the adhesive member at a position corresponding at least to the projection. Thus, the adhesive member negates differences in level on the body, allowing the design surface to be smooth.

9 Claims, 6 Drawing Sheets

MOLDED PRODUCT

CROSS-REFERENCE TO RELATED APPLICATION

This application is based upon and claims the benefit of priority from Japanese Patent Application No. 2018-126033 filed on Jul. 2, 2018, the contents of which are incorporated herein by reference.

BACKGROUND OF THE INVENTION

Field of the Invention

The present invention relates to molded products including bodies to which design members are stuck.

Description of the Related Art

To improve design quality, molded products are often provided with design members stuck to the bodies thereof. For example, Japanese Laid-Open Patent Publication No. 2005-113085 discloses a technique of sticking a substrate (design member) to an adherend (body). The design member has slotted grooves and is stacked on an adhesive layer (adhesive member) having through-passages at positions facing the slotted grooves. The through-passages and the slotted grooves lead the air existing between the adhesive member and the body to the outside when the design member is stuck to the body.

SUMMARY OF THE INVENTION

Such a molded product often has differences in level (projections or recesses) on a surface of the body due to, for example, components accommodated inside the body of the molded product. The differences in level on the body cannot be removed by sticking the design member to the surface of the body via the adhesive member and cause uneven parts on the design surface of the design member along the shapes of the projections or the recesses on the body. This lowers the design quality of the molded product.

The present invention has been devised taking into consideration the aforementioned problems, and has the object of providing a molded product with a simple structure capable of negating differences in level on the body and enabling formation of a smooth design surface.

To achieve the above-described object, a molded product according to a first aspect of the present invention comprises a body including a flat part and a projection protruding from the flat part, a design member including a design surface, and an adhesive member sticking the design member to the body, wherein the adhesive member includes a buffer portion formed by cutting off a part of the adhesive member at a position corresponding at least to the projection.

Moreover, to achieve the above-described object, a molded product according to a second aspect of the present invention comprises a body including a flat part and a plurality of recesses in the flat part, a design member including a design surface, and an adhesive member sticking the design member to the body, wherein the adhesive member includes a buffer portion formed by cutting off a part extending from a point corresponding to one recess among the plurality of recesses to a point corresponding to another recess.

The molded product according to the first aspect of the present invention includes the buffer portion formed by cutting off the part of the adhesive member at the position corresponding at least to the projection. This simple structure enables the formation of the smooth design surface. That is, the buffer portion accommodates the projection to prevent protuberance on the adhesive member caused by the projection. Thus, the differences in level on the body are negated, and the design member can be stuck to the body in a preferred manner. Consequently, the design quality of the molded product is improved, and thus the product quality and the like are also improved.

Moreover, the molded product according to the second aspect of the present invention includes the buffer portion formed by cutting off the part extending from the point corresponding to the one recess among the plurality of recesses to the point corresponding to the other recess. This simple structure enables air to freely move between the one recess and the other recess. Thus, the design member can be stuck to the body while the differences in level on the body are negated, and can be smoothly restored from a state with a depression, if any, caused by pressure, resulting in a smooth design surface.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of the present invention will be described in detail below with reference to the accompanying drawings.

First Embodiment

Figure 1:
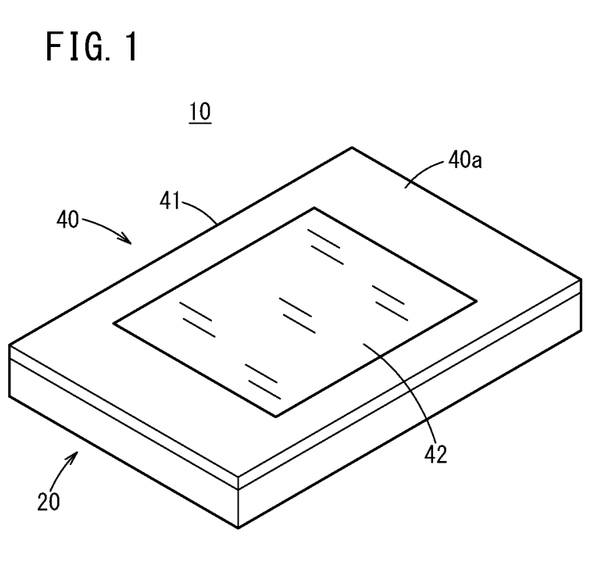
FIG. 1 is a schematic perspective view illustrating the entire structure of a molded product according to a first embodiment of the present invention.
Figure 2:
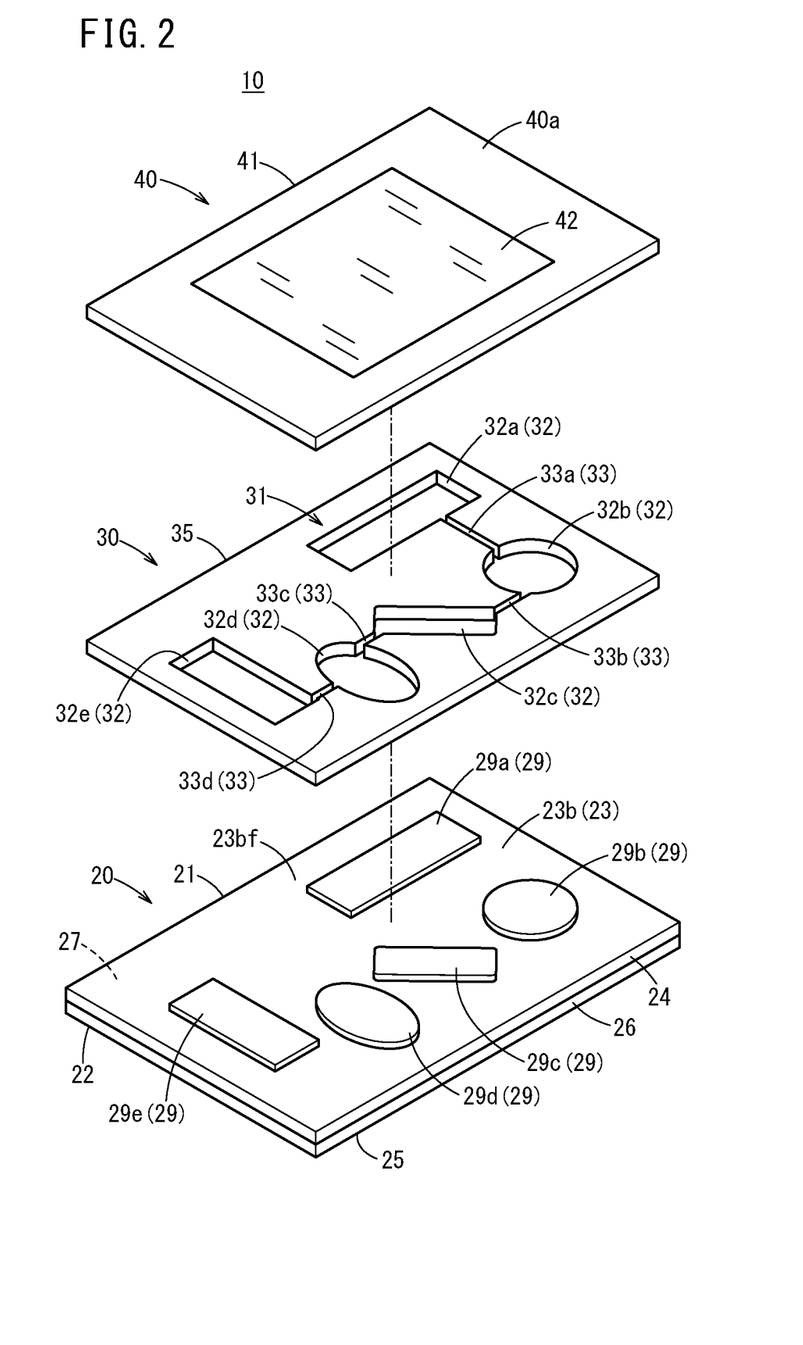
FIG. 2 is an exploded perspective view of the molded product in FIG. 1.

As illustrated in FIGS. 1 and 2, a molded product 10 according to a first embodiment of the present invention includes a body 20 and a design member 40 stuck to an outer surface of the body 20 via an adhesive member 30. Here, a card key is taken as an example of the molded product 10 according to the first embodiment. The card key has, for example, an information holding function allowing a user to get in a car (not illustrated) and to start the car.

The body 20 of the molded product 10 is formed by stacking an upper case 21 on a lower case 22, both having a square U-shaped section. Specifically, the upper case 21 includes a roof portion 23 with a predetermined planar shape (rectangular shape in FIG. 2) and an upper protruding portion 24 protruding downward from the entire peripheral edge of the roof portion 23. The lower case 22 includes a bottom portion 25 with a planar shape identical to the planar shape of the upper case 21 and a lower protruding portion 26 protruding upward from the entire peripheral edge of the bottom portion 25. The protruding ends of the upper protruding portion 24 and the lower protruding portion 26 are joined together such that the body 20 has a box shape with a hollow portion 27 inside the body 20.

Various components (structures, substrates, electrical and electronic components, and the like) are accommodated inside the hollow portion 27 of the body 20. For example, the molded product 10 (card key) includes a circuit board on which controllers and electronic components are mounted, and further includes a battery, an antenna, a physical key, and the like serving as structures. The body 20 has the thinnest height possible to increase the portability as a card key.

The roof portion 23 of the upper case 21 has recesses 28 in an inner surface 23a shaped according to the components accommodated in the hollow portion 27 (see also FIG. 4), whereas the inner and outer surfaces of the bottom portion 25 of the lower case 22 flatly expand in plane directions. The recesses 28 are small upward (direction away from the bottom portion 25 of the lower case 22) depressions formed in the inner surface 23a of the roof portion 23 to accommodate, for example, components thicker than the circuit board.

Figure 3A:
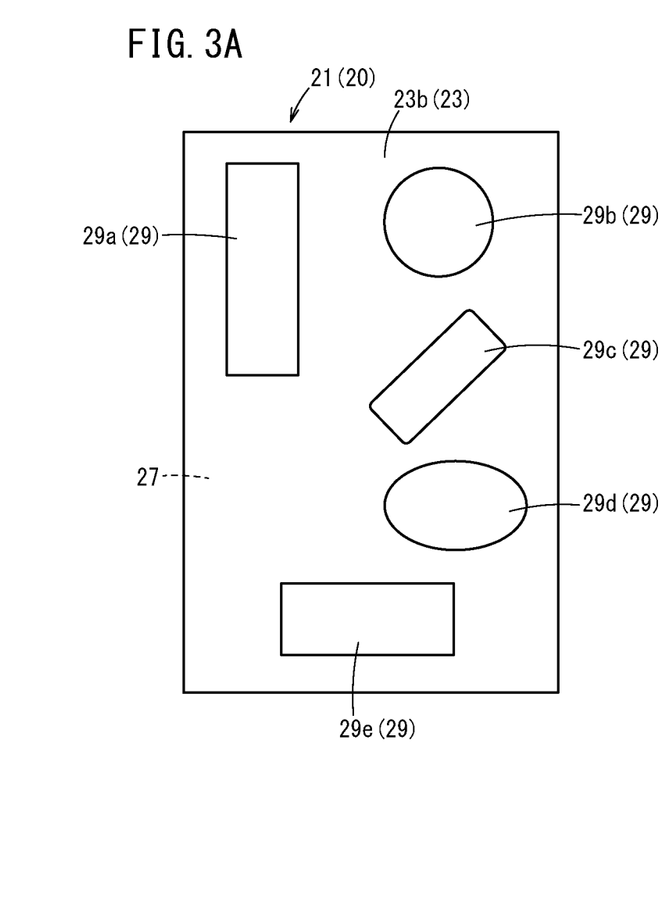
FIG. 3A is a plan view of a body in FIG. 1.

As illustrated in FIGS. 2 and 3A, an outer surface 23b of the roof portion 23 of the upper case 21 has one or a plurality of projections 29 corresponding to the recesses 28 of the inner surface 23a. The projections 29 have planar shapes (for convenience, rectangular, circular, and elliptical shapes in the drawings) corresponding to the components accommodated in the hollow portion 27, and slightly protrude outward (upward) from a flat part 23bf of the outer surface 23b of the roof portion 23. For example, the upper case 21 includes a plurality of projections 29, the number thereof corresponding to the number of the thick components (five in FIG. 2), with different flat shapes on the outer surface 23b.

Figure 3B:
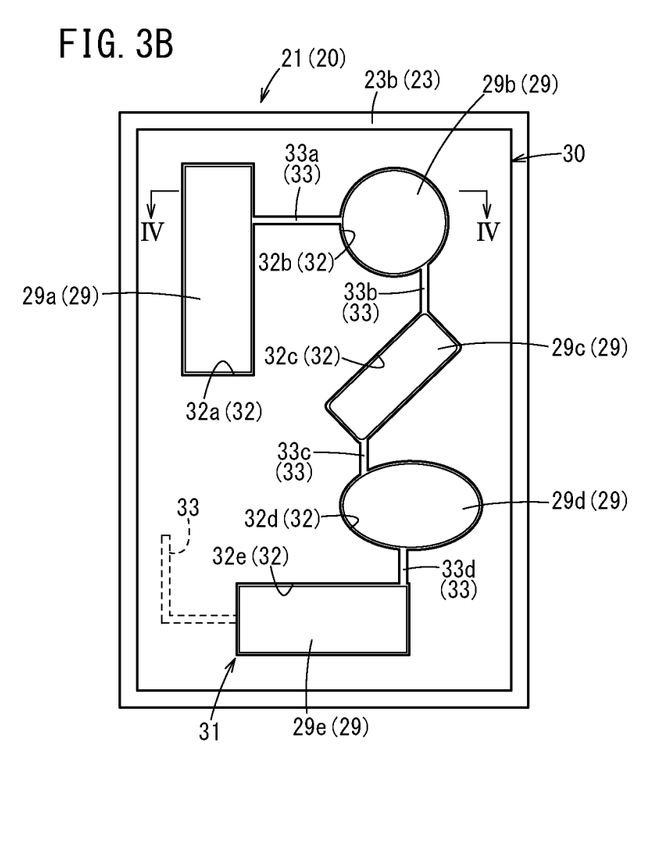
FIG. 3B is a plan view illustrating a state where an adhesive member is stuck to the body.

On the other hand, the adhesive member 30 has a function as a double-sided tape to stick the design member 40 to the outer surface 23b of the upper case 21 having the projections 29. As illustrated in FIGS. 2 and 3B, the adhesive member 30 is a flat sheet with a shape similar to (and a size slightly smaller than) the planar shape of the outer surface 23b of the upper case 21. Moreover, the adhesive member 30 expands in plane directions of the adhesive member 30 with a fixed thickness larger than the protruding lengths of the projections 29 of the body 20.

The adhesive member 30 according to this embodiment includes a buffer portion 31 formed by cutting parts corresponding to the projections 29 of the body 20 off the adhesive member 30 in the thickness direction. The buffer portion 31 prevents protuberances on the adhesive member 30 caused by the projections 29 of the body 20 so that the design member 40 can be flatly stuck, and also prevents depressions in the design member 40 while the molded product 10 is being used. The buffer portion 31 is a hollow passing or penetrating through both surfaces (upper and lower surfaces) of the adhesive member 30.

When the adhesive member 30 is in the stuck state where the adhesive member 30 is stuck to the body 20, the buffer portion 31 includes a plurality of accommodation parts 32 accommodating the projections 29 and a plurality of communication parts 33 communicating with the accommodation parts 32.

When viewed in plan, each of the accommodation parts 32 is shaped along the planar shape of the corresponding projection 29, and has an identical size to (or slightly larger size than) the corresponding projection 29. The thickness of the adhesive member 30 is larger than the protruding lengths of the projections 29 as described above. Thus, the accommodation parts 32 in the stuck state accommodate the entire projections 29 and create clearances 34 above the projections 29 as illustrated in FIG. 4.

Figure 4:
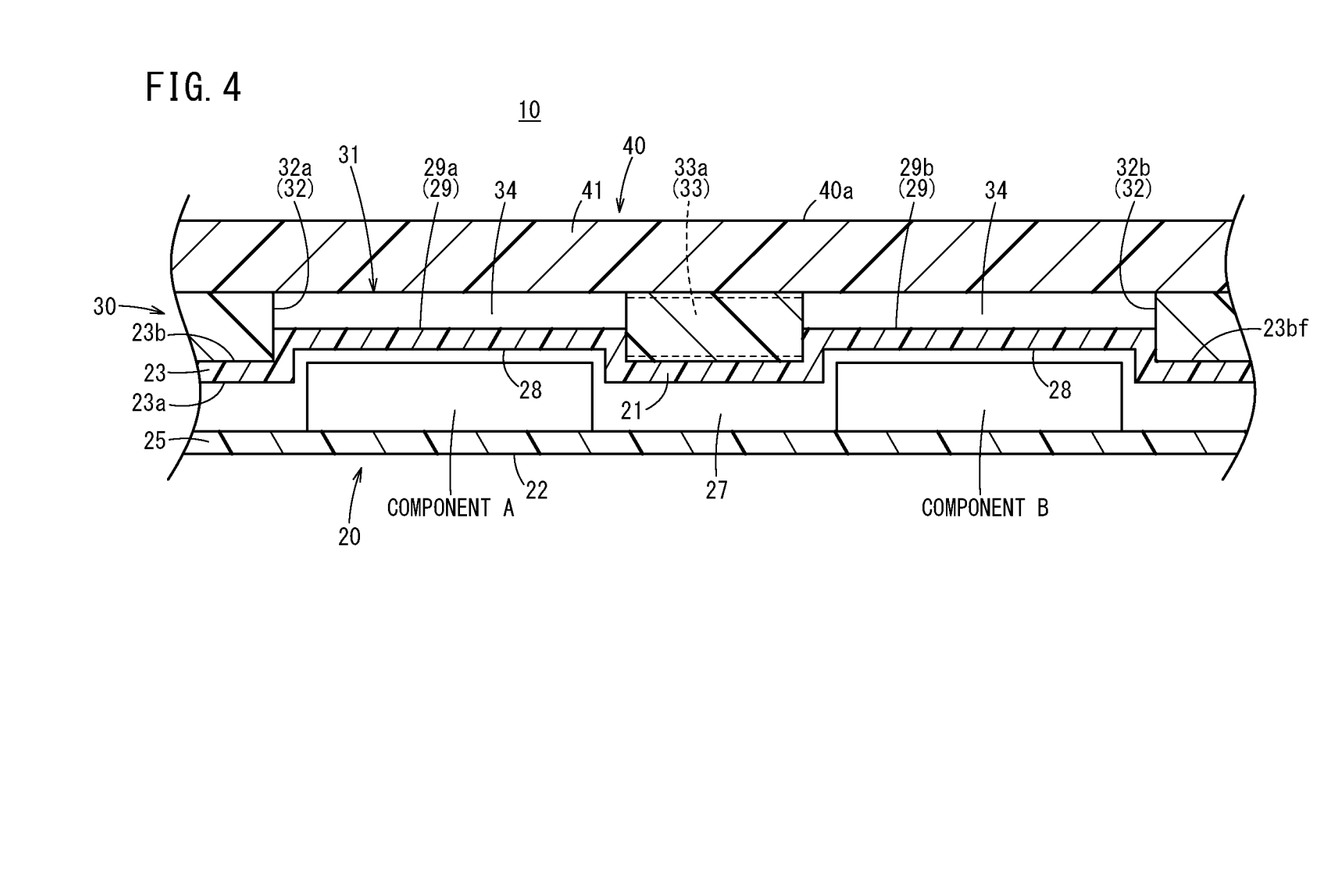
FIG. 4 is a cross-sectional view taken along line IV-IV in FIG. 3B.

As illustrated in FIGS. 3B and 4, the communication parts 33 are narrower than the planar shapes of the accommodation parts 32 and extend in plane direction of the adhesive member 30 (flat part 23bf of the body 20). Each of the communication parts 33 formed in the adhesive member 30 cross-links one accommodation part 32 among the plurality of accommodation parts 32 with another accommodation part 32. That is, the buffer portion 31 is formed of the plurality of accommodation parts 32 spatially connected with each other by the plurality of communication parts 33 (see also FIG. 2).

Specifically, when the body 20 and the adhesive member 30 illustrated in FIG. 3B are taken as an example, the body 20 includes first to fifth projections 29a to 29e. The first projection 29a is located in the upper left part of the body 20 in FIG. 3B, and the second to fifth projections 29b to 29e are arranged downward in turn from the upper right part of the body 20 in FIG. 3B. FIG. 4 illustrates a state where a component A is accommodated inside the first projection 29a and a component B is accommodated inside the second projection 29b. The buffer portion 31 of the adhesive member 30 also includes first to fifth accommodation parts 32a to 32e having the planar shapes of the respective first to fifth projections 29a to 29e at positions corresponding to (facing) the first to fifth projections 29a to 29e.

The communication parts 33 of the buffer portion 31 include a first communication part 33a connecting the first accommodation part 32a and the second accommodation part 32b, a second communication part 33b connecting the second accommodation part 32b and the third accommodation part 32c, a third communication part 33c connecting the third accommodation part 32c and the fourth accommodation part 32d, and a fourth communication part 33d connecting the fourth accommodation part 32d and the fifth accommodation part 32e. For example, each of the first to fourth communication parts 33a to 33d connects the two corresponding accommodation parts among the first to fifth accommodation parts 32a to 32e in the shortest distance.

The buffer portion 31 (the accommodation parts 32 and the communication parts 33) described above is formed inside an outer peripheral edge 35 of the adhesive member 30.

Thus, the buffer portion 31 in the stuck state does not communicate with the outside of the outer peripheral edge 35 of the adhesive member 30, and the design member 40 is stuck to the body 20 via the adhesive member 30 while the airtightness of the buffer portion 31 is increased.

Returning to FIG. 1, the design member 40 is stuck to the body 20 via the adhesive member 30 to improve design quality of the attachment surface of the molded product 10. The design member 40 is a flat decorative sheet 41 entirely covering one of the surfaces (outer surface 23b of the upper case 21) of the body 20. A design surface 42 is disposed on an upper surface 40a (surface opposite to the surface to which the adhesive member 30 is stuck) of the decorative sheet 41 in advance.

The decorative sheet 41 may have a layered structure (not illustrated) including a plurality of layers with different properties. For example, the plurality of layers include a transparent upper film, a non-transparent lower film, and a print layer disposed between the upper and lower films and having the glossy design surface 42 formed thereon. Thus, when the decorative sheet 41 of the molded product 10 is visually checked, the design surface 42 on the print layer stands out from the lower film through the upper film.

The molded product 10 according to this embodiment is basically configured as above, and the operational effects thereof will be described below.

During the production of the molded product 10, the upper case 21 and the lower case 22 are joined together while the components are arranged at appropriate positions, and assembled into the body 20 to constitute a card key as illustrated in FIG. 2. Subsequently, the adhesive member 30 is stuck to the upper case 21 of the body 20. During sticking of the adhesive member 30, the position of adhesive member 30 is adjusted such that the accommodation parts 32 of the buffer portion 31 overlap with the projections 29 of the body 20 (see also FIG. 3B). After the adhesive member 30 is stuck, the position of the decorative sheet 41 is adjusted with respect to the adhesive member 30, and the decorative sheet 41 is stuck to the adhesive member 30.

As illustrated in FIGS. 1 and 4, in the molded product 10, the decorative sheet 41 flatly expands since the accommodation parts 32 of the adhesive member 30 accommodate the projections 29. That is, although the projections 29 cause differences in level on the body 20, the buffer portion 31 of the adhesive member 30 absorbs the differences and enables the decorative sheet 41 to be stuck flatly.
Thus, the design surface 42 of the molded product 10 can be flat and smooth.

When the decorative sheet 41 is in the stuck state, the accommodation parts 32 create the clearances 34 between the upper surfaces of the projections 29 and the lower surface of the decorative sheet 41, and the plurality of clearances 34 are connected with each other by the communication parts 33. As a result, the buffer portion 31 includes a series of closed cavities. When the decorative sheet 41 is stuck, the clearances 34 and the communication parts 33 allow the air existing at the boundary between the body 20 and the adhesive member 30 and at the boundary between the adhesive member 30 and the decorative sheet 41 to escape. Thus, the air trapped at the boundaries can be reliably removed.

Figure 5A:
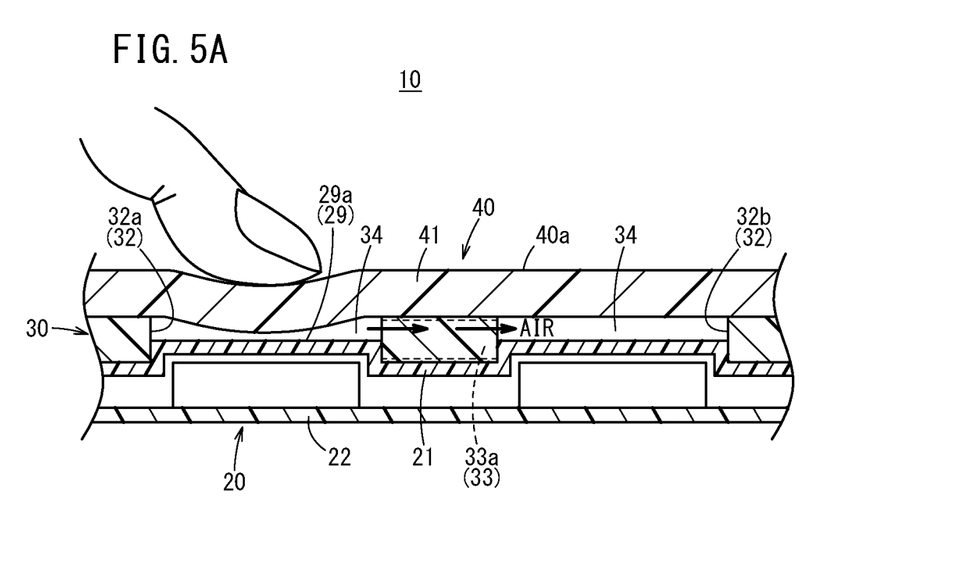
FIG. 5A is a cross-sectional view of the molded product to which pressure is applied.
Figure 5B:
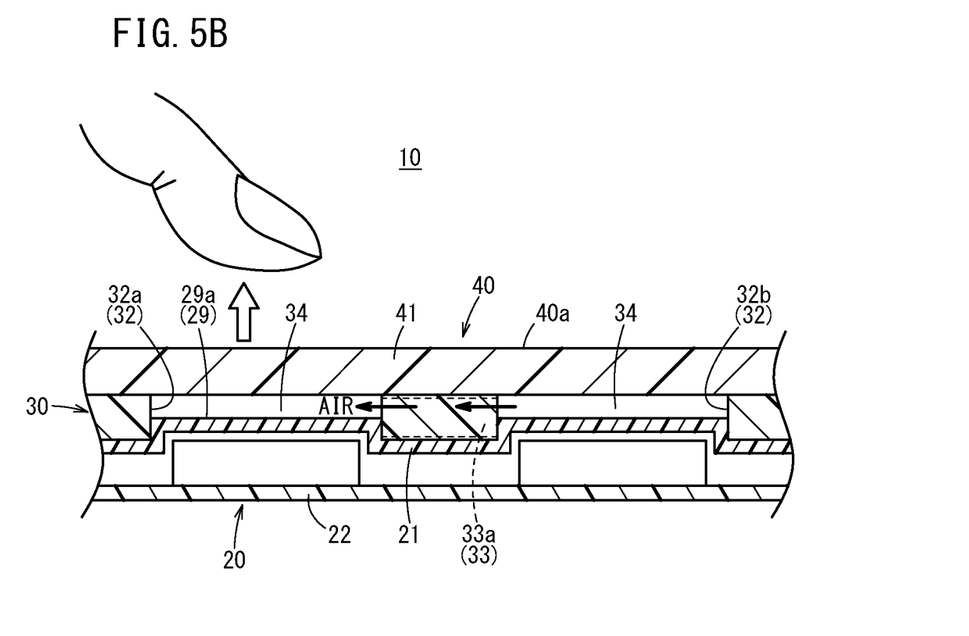
FIG. 5B is a cross-sectional view of the molded product from which the pressure is removed.

Next, effects while the molded product 10 is being used will be described with reference to FIGS. 5A and 5B, when a user applies pressure to a point at which one of the projections 29 is formed (point overlapping with the projection 29) on the body 20 using their finger and the like.

That is, when the user's finger presses the decorative sheet 41 at the point above the projection 29, the decorative sheet 41 is hollowed toward the projection 29 due to the existence of the clearance 34 between the projection 29 and the decorative sheet 41. At this moment, the air inside the clearance 34 moves to the other accommodation parts 32 (clearances 34) through the communication parts 33. For example, when the decorative sheet 41 is pressured at a point overlapping with the first accommodation part 32a, the air inside the first accommodation part 32a flows into the second accommodation part 32b through the first communication part 33a (or further flows into the third to fifth accommodation parts 32c to 32e through the second to fourth communication parts 33b to 33d). That is, the air existing between the body 20 and the decorative sheet 41 is freely movable inside the buffer portion 31 and is urged to actively move when pressure is applied. This prevents the air from leaking out from the closed cavities.

When the user's finger separates from the decorative sheet 41, the decorative sheet 41 is elastically restored to the original form (flat shape). At this moment, the air that has moved due to pressure smoothly returns from the other accommodation parts 32 and the communication parts 33, and the decorative sheet 41 is restored in a short time in a stable manner.

Here, let us assume that there are no communication parts 33 connecting the plurality of accommodation parts 32 and that the capacity of the clearances 34 is small accordingly. In this case, when pressure is applied to the decorative sheet 41, there is a possibility of air leakage from the clearances 34 (closed cavities) via gaps between fibers of the adhesive member 30, the boundary between the body 20 and the adhesive member 30, the boundary between the adhesive member 30 and the decorative sheet 41, or the like. Once the air leaks out from the clearances 34, the air hardly returns to the clearances 34 after the pressure is removed. Thus, the depression of the decorative sheet 41 may not be restored, or the restoration of the decorative sheet 41 may take time. That is, the decorative sheet 41 remains hollow and the design quality of the design surface 42 is lowered even after the user's finger separates from the molded product 10.

In contrast, as described above, the molded product 10 according to this embodiment includes the buffer portion 31 with a sufficient capacity and allows the air to freely move according to the deformation of the decorative sheet 41. Thus, when pressure is applied, the air actively moves inside the buffer portion 31, which allows the air to easily escape, and is prevented from leaking out from the buffer portion 31. Consequently, the decorative sheet 41 is easily restored as the air moves, and the design quality of the design surface 42 can be favorably maintained.

The molded product 10 according to the present invention is not limited to the above-described embodiment, and various modifications can be made thereto without departing from the scope of the present invention. For example, the planar shapes of the accommodation parts 32 formed in the adhesive member 30 may be slightly larger than the planar shapes of the respective projections 29 in plane directions. This enables the projections 29 to be easily accommodated inside the accommodation parts 32 when the adhesive member 30 is stuck to the body 20 before the design member 40 is stuck to the adhesive member 30 (during production).

Moreover, the molded product 10 need not necessarily include the communication parts 33 in the buffer portion 31 of the adhesive member 30. For example, in a case where the planar shapes of the accommodation parts 32 are made large, the capacity of the clearances 34 is increased accordingly. Thus, when pressure is applied to the decorative sheet 41, the air can move inside the clearance 34, and the decorative sheet 41 can be smoothly restored.

Moreover, all the accommodation parts 32 of the buffer portion 31 do not necessarily communicate with each other via the communication parts 33 in series. Instead, unlike the above-described embodiment, part of the accommodation parts 32 may communicate with each other. For example, the first to third accommodation parts 32a to 32c communicating with each other via the first and second communication parts 33a and 33b may constitute a series of cavities, and the fourth accommodation part 32*d* and the fifth accommodation part 32*e* communicating with each other via the fourth communication part 33*d* may constitute another series of cavities.

The communication parts 33 each cross-link two accommodation parts 32. Instead, as indicated by dotted lines in FIG. 3B, the communication parts 33 may include one end communicating with one of the accommodation parts 32 and another end that terminates. This structure also allows the air inside the accommodation parts 32 to move into the communication parts 33 when pressure is applied, and produces effects similar to those described above.

Moreover, the shape of the communication parts 33 is not limited to a linear shape. The communication parts 33 may adopt various shapes having appropriate capacities and capable of preventing the deformation of the decorative sheet 41 at the points overlapping with the communication parts 33.

Second Embodiment

Figure 6A:
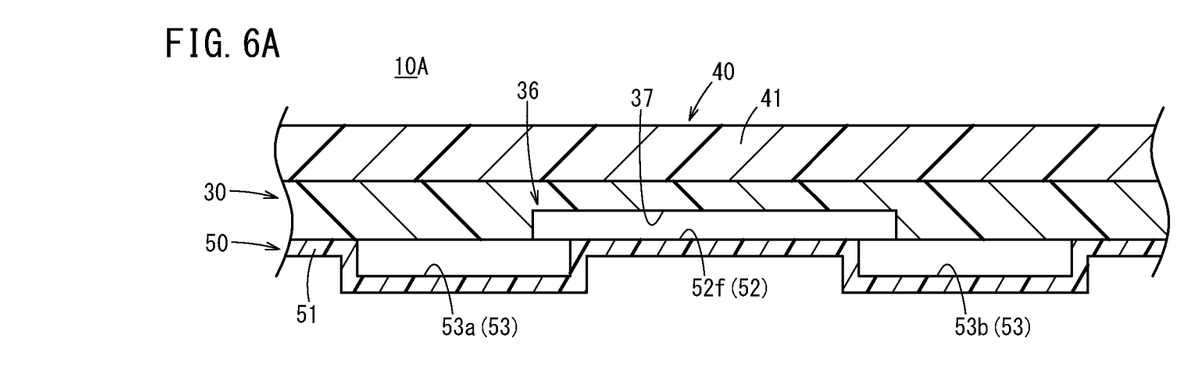
FIG. 6A is a partial cross-sectional view of a molded product according to a second embodiment.

As illustrated in FIG. 6A, a molded product 10A according to a second embodiment is different from the molded product 10 according to the first embodiment in that an outer surface 52 of a portion (roof portion 51) of a body 50 to which the decorative sheet 41 is stuck is provided with a plurality of recesses 53. In the description below, the same reference numerals and symbols are used for components having identical structures or functions to those in the above-described embodiment, and the detailed descriptions thereof will be omitted.

For example, the roof portion 51 of the body 50 is provided with a first recess 53*a* and a second recess 53*b* having a predetermined depth from a flat part 52*f* of the outer surface 52 as the plurality of recesses 53. On the other hand, the adhesive member 30 sticking the decorative sheet 41 to the body 50 includes a buffer portion 36 connecting the first recess 53*a* and the second recess 53*b*.

Specifically, the buffer portion 36 includes only one communication part 37 connecting the first recess 53*a* and the second recess 53*b*. The communication part 37 has a groove shape formed by cutting a part thinner than the adhesive member 30 off a surface of the adhesive member 30 facing the body 50. Moreover, one end of the communication part 37 extends to a position facing (overlapping with) the first recess 53*a*, and another end of the communication part 37 extends to a position facing the second recess 53*b*.

Thus, the communication part 37 functions as a passage allowing the air to flow between the first recess 53*a* and the second recess 53*b* when the adhesive member 30 is in the stuck state. The communication part 37 may extend through the adhesive member 30 in the thickness direction.

The molded product 10A according to the second embodiment is basically configured as above and produces effects similar to those of the molded product 10 according to the first embodiment. That is, in a case where the adhesive member 30 is not provided with the communication part 37 while the body 50 is provided with the recesses 53, the air may leak out from inside the recesses 53 when pressure is applied to the decorative sheet 41, and the decorative sheet 41 may not be smoothly restored after being hollowed toward the bottoms of the recesses 53. In contrast, the molded product 10A according to this embodiment allows the air to freely move between the first recess 53*a* and the second recess 53*b* via the communication part 37 provided for the adhesive member 30. Thus, the decorative sheet 41 hollowed due to pressure or the like can be smoothly restored by the air returning after the pressure is removed, allowing the design surface 42 to be stably kept smooth (flat).

Third Embodiment

Figure 6B:
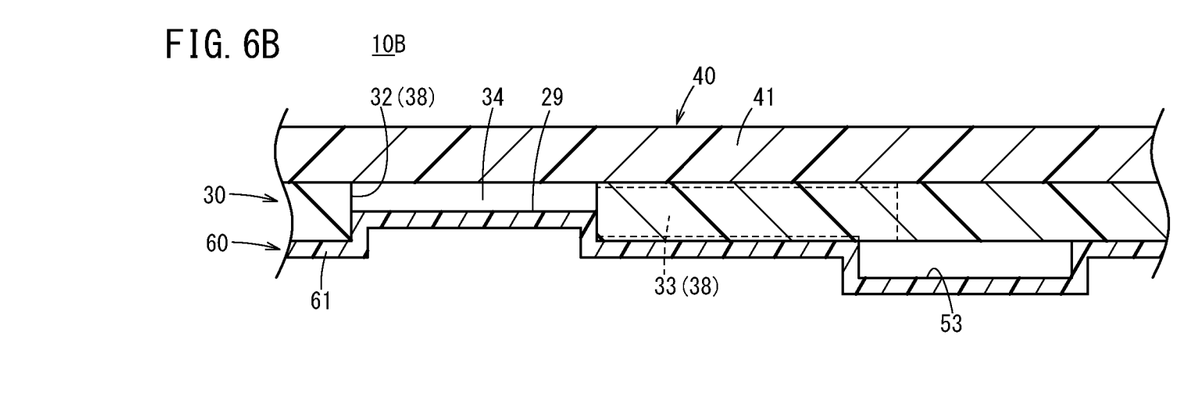
FIG. 6B is a partial cross-sectional view of a molded product according to a third embodiment.

As in a molded product 10B according to a third embodiment illustrated in FIG. 6B, a body 60 (roof portion 61) may be provided with both a projection 29 and a recess 53. This structure also allows the design surface 42 of the decorative sheet 41 to be kept smooth due to a buffer portion 38 provided for the adhesive member 30. That is, the buffer portion 38 in this case includes an accommodation part 32 accommodating the projection 29 and a communication part 33 connecting the accommodation part 32 and the recess 53 (extending to a position facing the recess 53) of the body 60. This also allows the molded product 10B to operate similarly to the above-described molded product 10.

The molded products 10, 10A, and 10B according to the above-described embodiments produce the following advantageous effects.

The molded products 10 and 10B respectively include the buffer portions 31 and 38 formed by cutting off parts of the adhesive member 30 at positions corresponding at least to the projections 29. This simple structure enables the formation of the smooth design surface 42. That is, the buffer portions 31 and 38 accommodate the projections 29 to prevent protuberance on the adhesive member 30 caused by the projections 29. Thus, the differences in level on the bodies 20 and 60 are negated, and the design member 40 can be stuck to the bodies 20 and 60 in a preferred manner. Consequently, the design quality of the molded products 10 and 10B is improved, and thus the product quality, for example, is also improved.

The buffer portions 31 and 38 of the molded products 10 and 10B, respectively, include the accommodation parts 32 accommodating the projections 29 and the communication parts 33 communicating with the accommodation parts 32. Thus, in the molded products 10 and 10B, the air inside the accommodation parts 32 can freely move when the design member 40 is hollowed at the points overlapping with the accommodation parts 32 due to pressure or the like, and the air returns to the accommodation parts 32 from the communication parts 33 and the like when the pressure is removed. As a result, the design member 40 can be smoothly restored.

Each of the communication parts 33 of the buffer portion 31 connects one accommodation part 32 with another accommodation part 32 among the accommodation parts 32. Thus, in the molded product 10, the capacity of the buffer portion 31 can be significantly increased, allowing more sufficient air inside the accommodation parts 32 to move.

In the molded products 10 and 10B, the thickness of the adhesive member 30 is larger than the protruding lengths of the projections 29. Thus, the accommodation parts 32 reliably accommodate the projections 29 inside the buffer portions 31 and 38, and prevent protuberance on the design surface 42 of the design member 40 from being generated during the production.

The buffer portions 31 and 38 extend through the adhesive member 30 in the thickness direction. To achieve this, the adhesive member 30 is produced by, for example, cutting the buffer portions 31 and 38 off the adhesive member 30 or by shaping without the buffer portions 31 and 38 during the production of the adhesive member 30. In this manner, the production can be simplified, and thus the production costs can be reduced.

Moreover, the molded product 10A includes the buffer portion 36 formed by cutting off a part extending from the point corresponding to one of the recesses 53 to the point corresponding to the other recess 53. This structure is simple yet capable of keeping the design surface 42 smooth. That is, the buffer portion 36 allows the air to freely move between the one recess 53 to the other recess 53. Thus, the design member 40 hollowed at the points overlapping with the recesses 53 due to pressure can be smoothly restored by the air returning after the pressure is removed.

The molded products 10, 10A, and 10B respectively include the buffer portions 31, 36, and 38 inside the outer peripheral edge 35 of the adhesive member 30, and thus the buffer portions 31, 36, and 38 are hermetically closed. This increases resistance to water and dust, and, for example, foreign substances are prevented from entering the buffer portions 31, 36, and 38. Consequently, the adhesion of the adhesive member 30 is maintained for a significantly long term.

The present invention is also applicable to keys (remote keys, smart keys, and the like) for vehicles other than the card key described above as a matter of course, and is applicable to the molded product 10 of various types to which the design member 40 is stuck.

What is claimed is:

1. A molded product, comprising:
a body including a flat part and a projection protruding from the flat part;
a design member including a design surface; and
an adhesive member sticking the design member to the body, wherein:
the adhesive member includes a buffer portion formed by cutting off a part of the adhesive member at a position corresponding at least to the projection, and
the buffer portion includes an accommodation part that receives the projection.

2. The molded product according to claim 1, wherein the adhesive member further includes another accommodation part; and
the buffer portion includes a communication part in fluid communication with the accommodation parts while extending in a plane direction of the flat part.

3. The molded product according to claim 1, wherein a thickness of the adhesive member is larger than a protruding length of the projection.

4. The molded product according to claim 3, further comprising a hollow cavity positioned between the design member and a distal end of the projection, wherein the hollow cavity is defined by the accommodating part of the buffer portion.

5. The molded product according to claim 1, wherein the buffer portion extends through the adhesive member in a thickness direction of the adhesive member.

6. The molded product according to claim 1, wherein the buffer portion is disposed inside an outer peripheral edge of the adhesive member.

7. A molded product, comprising:
a body including a flat part and a plurality of recesses in the flat part;
a design member including a design surface; and
an adhesive member sticking the design member to the body, wherein:
the adhesive member includes a buffer portion comprising:
a plurality of accommodating parts that receive the plurality of recesses, and
a communication part that extends between the plurality of accommodating parts, wherein the plurality of accommodating parts and the communication part are formed by removing a portion of the adhesive member.

8. The molded product according to claim 7, wherein the buffer portion is disposed inside an outer peripheral edge of the adhesive member.

9. The molded product according to claim 7, further comprising a plurality of hollow cavities positioned between the design member and the plurality of recesses in a thickness direction of the molded product, wherein the plurality of hollow cavities are in fluid communication with each other via the communication part of the buffer portion.

* * * * *